(12) United States Patent
Muhammad

(10) Patent No.: US 12,538,223 B2
(45) Date of Patent: Jan. 27, 2026

(54) SWITCHING OF O-RU TO A PLURALITY OF POWER SAVING MODES

(71) Applicant: RAKUTEN MOBILE, INC., Tokyo (JP)

(72) Inventor: Awn Muhammad, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 415 days.

(21) Appl. No.: 18/021,254

(22) PCT Filed: Sep. 26, 2022

(86) PCT No.: PCT/JP2022/035632
§ 371 (c)(1),
(2) Date: Feb. 14, 2023

(87) PCT Pub. No.: WO2023/157363
PCT Pub. Date: Aug. 24, 2023

(65) Prior Publication Data
US 2024/0267841 A1 Aug. 8, 2024

(30) Foreign Application Priority Data

Feb. 15, 2022 (JP) ................................. 2022-021185
Jul. 19, 2022 (WO) ................... PCT/JP2022/028091
Jul. 26, 2022 (JP) ................................. 2022-119061

(51) Int. Cl.
*H04L 5/00* (2006.01)
*H04W 52/02* (2009.01)

(52) U.S. Cl.
CPC .............................. *H04W 52/0206* (2013.01)

(58) Field of Classification Search
CPC .... H04L 5/14; H04B 7/0617; H04W 52/0206; H04W 52/16; H04W 52/34; H04W 72/51; H04W 76/20; H04W 68/02; H04W 72/231
See application file for complete search history.

(56) References Cited

U.S. PATENT DOCUMENTS 10,009,836 B2 * 6/2018 Zhu ...................... H04L 5/0048
12,133,168 B2 * 10/2024 Zhao ..................... H04W 72/23
(Continued)

FOREIGN PATENT DOCUMENTS

JP  2013-528959 A  7/2013
JP  2015-061262 A  3/2015
(Continued)

OTHER PUBLICATIONS

Turgay Pamuklu et al. "Energy-Efficient and Delay-Guaranteed Joint Resource Allocation and DU Selection in O-RAN" (when appropriate), Abstract, 1. Introduction, Jan. 29, 2022, 6 page(s).
(Continued)

*Primary Examiner* — Phuoc H Doan
(74) *Attorney, Agent, or Firm* — Sughrue Mion, PLLC

(57) ABSTRACT

A radio access network control apparatus that controls O-RAN including O-RU as radio unit, has at least one processor that performs: by an energy saving information notification unit, causing the O-RU to notify energy saving information concerning energy saving mode that the O-RU can support. The at least one processor that performs: by an energy saving mode switching unit, switching the O-RU to an energy saving mode that the O-RU can support; and by a communication function reconfiguration unit, reconfiguring the communication function of the O-RU in accordance with the switched energy saving mode. The radio access network control apparatus is provided in at least one of the SMO (Service Management and Orchestration), the Non-RT
(Continued)

RIC (Non-Real Time RAN Intelligent Controller), the Near-RT RIC (Near-Real Time RAN Intelligent Controller), the O-CU, and the O-DU.

20 Claims, 8 Drawing Sheets

(56) References Cited

U.S. PATENT DOCUMENTS

| | | |
|---|---|---|
| 2012/0015657 A1 | 1/2012 | Comsa et al. |
| 2016/0174150 A1 | 6/2016 | Comsa et al. |
| 2016/0205623 A1 | 7/2016 | Uchiyama et al. |
| 2022/0416868 A1 | 12/2022 | Schreck et al. |
| 2025/0113298 A1 | 4/2025 | Lins de Medeiros et al. |

FOREIGN PATENT DOCUMENTS

| | | |
|---|---|---|
| JP | 2021-083058 A | 5/2021 |
| WO | 2021/144972 A1 | 7/2021 |

OTHER PUBLICATIONS

International Search Report for PCT/JP2022/035632 dated Dec. 6, 2022.
English Translation of Japanese communication dated Jun. 3, 2025 in application No. 2024-500930.

\* cited by examiner

FIG. 5

| Sleep Level | Deactivation Duration | Minimum Sleep Duration | Activation Duration | Power Saving Options (Reconfiguration Options) | Power Consumption (statistics) |
|---|---|---|---|---|---|
| SM1 | 35.5 µs | 71 µs | 35.5 µs | - Entirely off<br>- Partly off<br>- HW reconfiguration<br>- SW recnfiguration | Total: XXX Watts<br>- Component A: xxx Watts<br>- Component B: yyy Watts<br>- Component C: zzz Watts |
| SM2 | 0.5 ms | 1 ms | 0.5 ms | ... | ... |
| SM3 | 5 ms | 10 ms | 5 ms | ... | ... |
| SM4 | 0.5 s | 1 s | 0.5 s | ... | ... |
| SM5 | Arbitrary (≧ 0.5 s) | Arbitrary (≧ 1 s) | Arbitrary (≧ 0.5 s) | ... | ... |

FIG. 6

| Sleep Level | Sleep Duration | HW component to be turned off | MIMO setting (No. of active antennas) | Clock (Synchronization) | Active planes |
|---|---|---|---|---|---|
| Micro Sleep (SM1) | Symbol(s) | Power amplifier Low-noise amplifier | 64 | On | C-Plane S-Plane M-Plane |
| Light Sleep (SM2) | Up to 5-10 ms | (in addition to the above) Transceiver circuit | 16 | On | C-Plane S-Plane M-Plane |
| Deep Sleep (SM3) | Up to 50-100 ms | (in addition to the above) Most HW components except for synchronization circuit | 4 | On | S-Plane M-Plane |
| Hibernate Sleep (SM4) | Up to 1000 ms | Every HW component | 0 | Off | M-Plane |

SWITCHING OF O-RU TO A PLURALITY OF POWER SAVING MODES

CROSS REFERENCE TO RELATED APPLICATIONS

This application is a National Stage of International Application No. PCT/JP2022/035632 filed Sep. 26, 2022, claiming priority based on Japanese Patent Application No. 2022-021185, filed Feb. 15, 2022, International Patent Application PCT/JP2022/028091, filed Jul. 19, 2022 and Japanese Patent Application No. 2022-119061, filed Jul. 26, 2022.

BACKGROUND OF THE INVENTION

1. Field of the Invention

The present disclosure relates to switching of O-RU to a plurality of power saving modes.

2. Description of the Related Art

For the purpose of the so-called open radio access network (RAN) in a mobile communication system, "Open RAN", "O-RAN", "vRAN" and the like are being considered. In the specification, "O-RAN" is used as a comprehensive term for such various "open radio access networks". Therefore, the interpretation of "O-RAN" in the specification is not limited to the standard and/or the specification of the same name "O-RAN" specified by the O-RAN Alliance.

A radio unit (RU) in the O-RAN is called an O-RU and provides a communication cell to a communication device (UE: User Equipment). The O-RUs are controlled by RAN nodes, which are composed of the O-CUs, which are central units (CUs), and/or the O-DUs, which are distributed units (DUs). Furthermore, RAN nodes are controlled by the Near-RT RIC (Near-Real Time RAN Intelligent Controller) and/or the Non-RT RIC (Non-Real Time RAN Intelligent Controller) and the like, which are higher-level controllers. The O-RAN also provides a virtual infrastructure, also called O-Cloud, that virtually manages a set of a plurality of RAN nodes.

Patent Literature 1: JP-A-2021-83058

SUMMARY OF THE INVENTION

In the conventional O-RAN, a mechanism to manage the energy consumption in the O-RUs was not well defined.

The present disclosure was made in view of the circumstances, and the purpose is to provide a radio access network control apparatus and the like that can effectively manage the energy consumption in the O-RU.

In order to solve the above issue, a radio access network control apparatus that controls O-RAN including O-RU as radio unit in a certain aspect of the present disclosure includes at least one processor that performs: by an energy saving mode switching unit, switching the O-RU to one of a plurality of energy saving modes among which at least one of a component of the O-RU to be switched to an off state and a duration differs.

According to the aspect, by switching the O-RU to one of the plurality of energy saving modes among which at least one of the component of the O-RU to be switched to the off state and the duration differs, the energy consumption in the O-RU can be effectively managed.

Another aspect of the present disclosure is a radio access network control method that controls O-RAN including O-RU as radio unit. The method includes: switching the O-RU to one of a plurality of energy saving modes among which at least one of a component of the O-RU to be switched to an off state and a duration differs.

Further another aspect of the present disclosure is a computer-readable medium. The computer-readable medium stores a radio access network control program that controls O-RAN including O-RU as radio unit, causing a computer to perform: switching the O-RU to one of a plurality of energy saving modes among which at least one of a component of the O-RU to be switched to an off state and a duration differs In addition, any combination of the above components, and any conversion of the expression of the present disclosure among methods, devices, systems, recording media, computer programs and the like are also encompassed within the disclosure.

According to the present disclosure, energy consumption in O-RU can be effectively managed.

BRIEF DESCRIPTION OF THE DRAWINGS

FIG. 5 shows a specific example of the energy saving mode of the O-RU included in the energy saving information notified by the energy saving information notification unit.

FIG. 6 shows other specific example of multiple energy saving modes that can be supported by O-RU.

DETAILED DESCRIPTION OF THE INVENTION

In the following, the present embodiment is described in accordance with the "O-RAN" which is the standard and/or the specification developed by the O-RAN Alliance. Therefore, the known terms defined in "O-RAN" will be used in the present embodiment just for convenience, but the technologies according to the disclosure can be applied to other existing radio access networks such as "Open RAN" and "vRAN" and/or to similar radio access networks that may be developed in the future.

Figure 1:
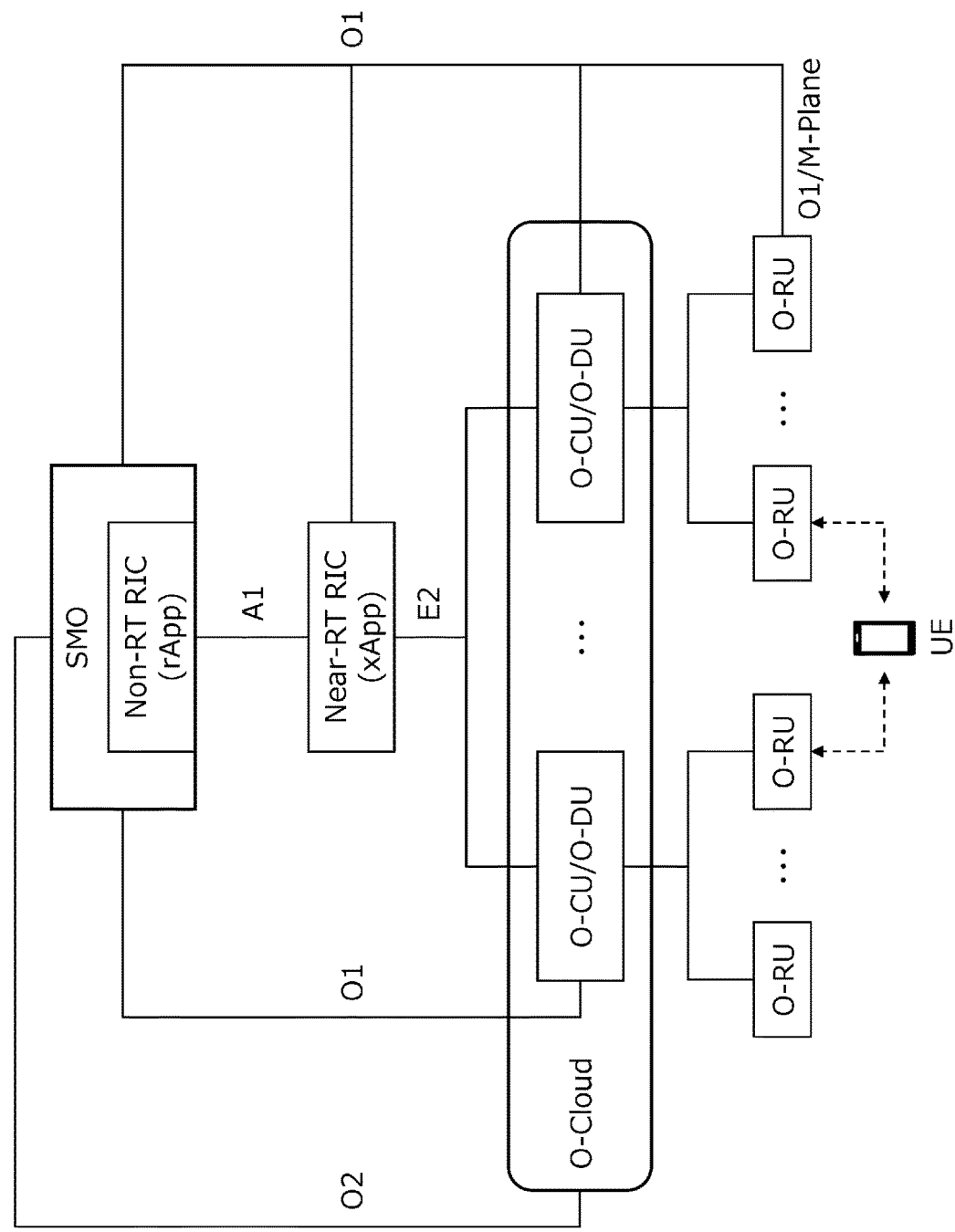
FIG. 1 is a schematic overview of a radio access network control apparatus.

FIG. 1 shows a schematic overview of the radio access network control apparatus according to the present embodiment. The radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (for example 1 second or longer), issues policies, policies, guidance and the like concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (for example shorter than 1 second), executes application software called xApp to control each RAN node (O-CU/O-DU) itself and/or general-purpose hardware and the like in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data and the like of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (for example Open Fronthaul M-Plane).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
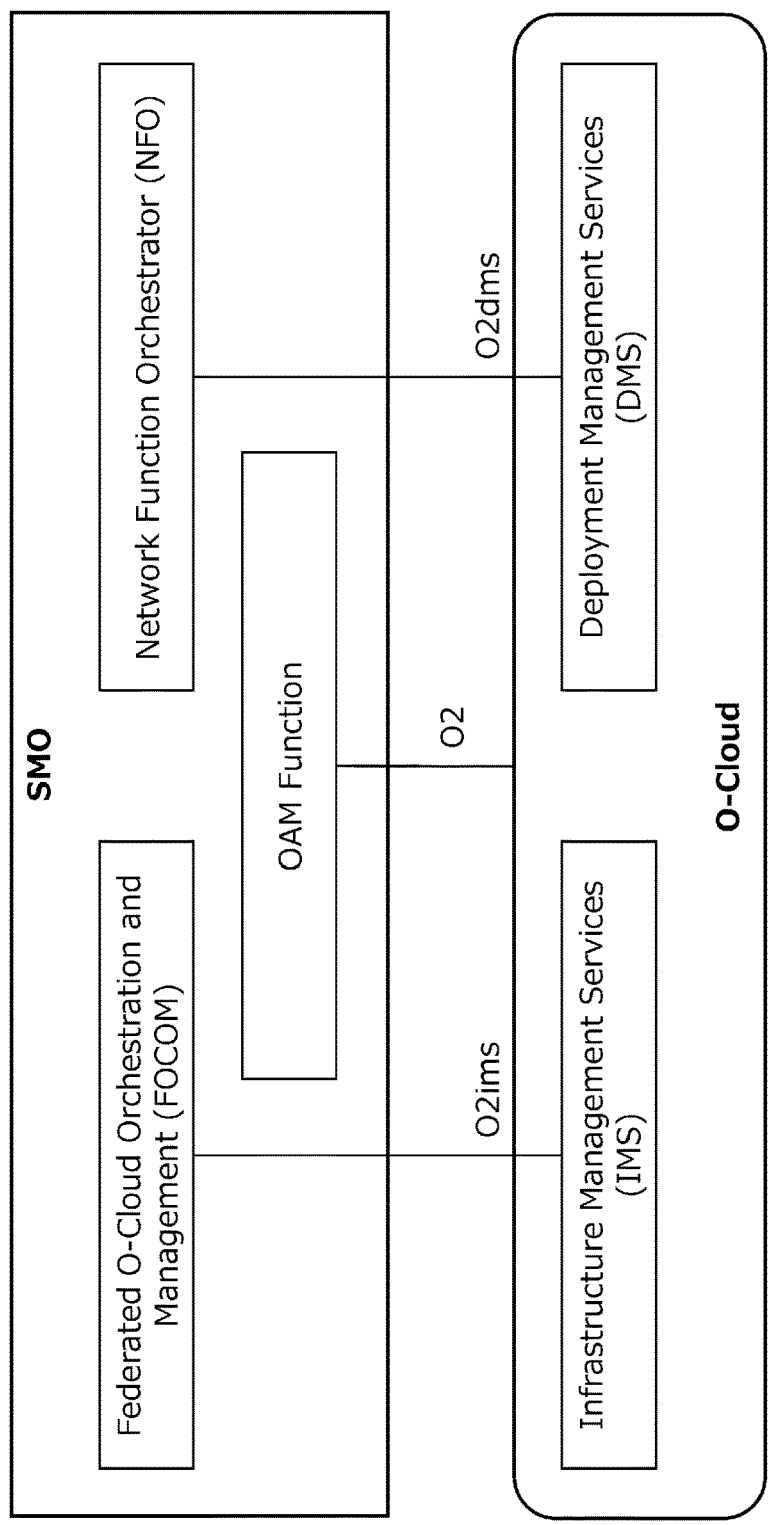
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2ims). The NFO realizes the orchestrated operation of a set of network functions (NFs) by a plurality of NE Deployments in the O-Cloud, while receiving services from the DMS of the O-Cloud through the O2 interface (O2dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2ims and/or the O2dms. The IMS is responsible for managing the O-Cloud resources (hardware) and/or the software used for managing them, and provides services primarily to the FOCOM of the SMO. DMS is responsible for the management of the plurality of NF Deployments in the O-Cloud, specifically the initiation, monitoring, termination and the like, and provides services primarily to the NFO of the SMO.

Figure 3:
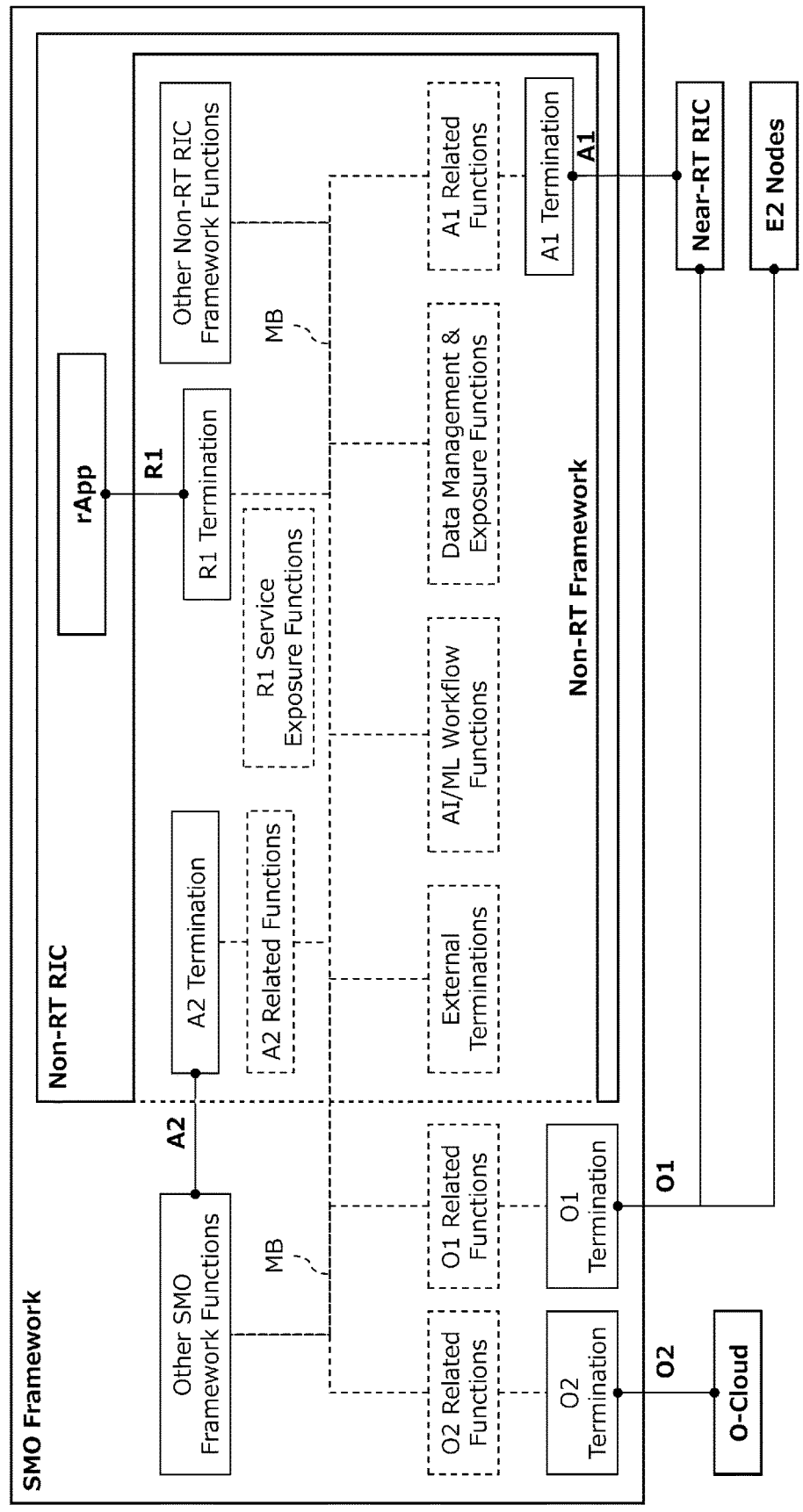
FIG. 3 is a schematic representation of structures and/or functions inside the SMO and/or the Non-RT RIC.

FIG. 3 is a schematic representation of structures and/or functions inside the SMO and/or the Non-RT RIC. The SMO or the SMO framework includes the Non-RT RIC. Inside the Non-RT RIC is divided into the Non-RT framework or the Non-RT RIC framework and the rApp. The solid lines in the figure represent functional blocks and/or connections defined in the O-RAN. The dotted lines in the figure represent functional blocks and/or connections that can be implemented in the O-RAN.

In the SMO framework excluding the Non-RT RIC, the O1 Termination, the O1 Related Functions, the O2 Termination, the O2 Related Functions, and the Other SMO Framework Functions are provided. The O1 Termination is the termination of the O1 interface in the SMO framework. As also shown in FIG. 1, the O1 Termination is connected to the Near-RT RIC and/or the E2 nodes (RAN nodes such as O-CUs/O-DUs, O-RU and the like) via the O1 interface. The O1 Related Functions directly connected the O1 Termination provide various functions related to the O1 interface, the Near-RT RIC, the E2 node and the like The O2 Termination is the termination of the O2 interface in the SMO framework. As also shown in FIG. 1, the O2 Termination is connected to the O-Cloud via the O2 interface. The O2 Related Functions directly connected the O2 Termination provide various functions related to the O2 interface, the O-Cloud and the like The Other SMO Framework Functions provide other functions except for the O1 Related Functions and the O2 Related Functions. The Other SMO Framework Functions are connected to the A2 Termination (described below) in the Non-RT RIC via the A2 interface. Various functions of the SMO framework such as the O1 Related Functions, the O2 Related Functions, and the Other SMO Framework Functions, are connected to the main bus MB extending also inside the Non-RT RIC. Each of the functional blocks can exchange data with other functional blocks inside and outside the SMO framework (or inside and outside the Non-RT RIC) through the main bus MB.

In the Non-RT framework, which is the area of the Non-RT RIC excluding the rApp, the A1 Termination, the A1 Related Functions, the A2 Termination, the A2 Related Functions, the R1 Termination, the R1 Service Exposure Functions, the External Terminations, the Data Management & Exposure Functions, the AI (Artificial Intelligence)/ML (Machine Learning) Workflow Functions, and the Other Non-RT RIC Framework Functions are provided.

The A1 Termination is the termination of the A1 interface in the Non-RT framework. As also shown in FIG. 1, the A1

Termination is connected to the Near-RT RIC via the A1 interface. The A1 Related Functions directly connected the A1 Termination provide various functions related to the A1 interface, the Near-RT RIC and the like The A2 Termination is the termination of the A2 interface in the Non-RT framework. The A2 Termination is connected to the Other SMO Framework Functions of the SMO framework via the A2 interface. The A2 Related Functions directly connected the A2 Termination provide various functions related to the A2 interface, the Other SMO Framework Functions and the like The R1 Termination is the termination of the R1 interface in the Non-RT framework. The R1 Termination is connected to the rApp running on the Non-RT RIC via the R1 interface. In other words, the R1 interface constitutes the API (Application Programming Interface) for the rApp. The R1 Service Exposure Functions accompanying the R1 Termination provide the function of disclosing data related to services such as the R1 interface and the rApp to the main bus MB and the like and/or provide the function of disclosing data from the main bus MB and the like to the R1 Termination and the like for services such as the R1 interface and the rApp. The External Terminations are terminations of various external interfaces (not shown) in the Non-RT framework.

The Data Management & Exposure Functions manage various data on the main bus MB, and provide the function of disclosing them in a manner in accordance with the access right of each functional block. The AI/ML Workflow Functions provide the function of managing workflows executed using the artificial intelligence (AI) capability and/or the machine learning (ML) capability implemented in the Non-RT RIC and/or the Near-RT RIC. The Other Non-RT RIC Framework Functions provide other functions except for the above various Non-RT framework functions. Various functions of the Non-RT framework such as the A1 Related Functions, the A2 Related Functions, the R1 Termination, the R1 Service Exposure Functions, the External Terminations, the Data Management & Exposure Functions, the AI/ML Workflow Functions, and the Other Non-RT RIC Framework Functions, are connected to the main bus MB extending also outside the Non-RT RIC. Each of the functional blocks can exchange data with other functional blocks inside and outside the Non-RT RIC through the main bus MB.

Figure 4:
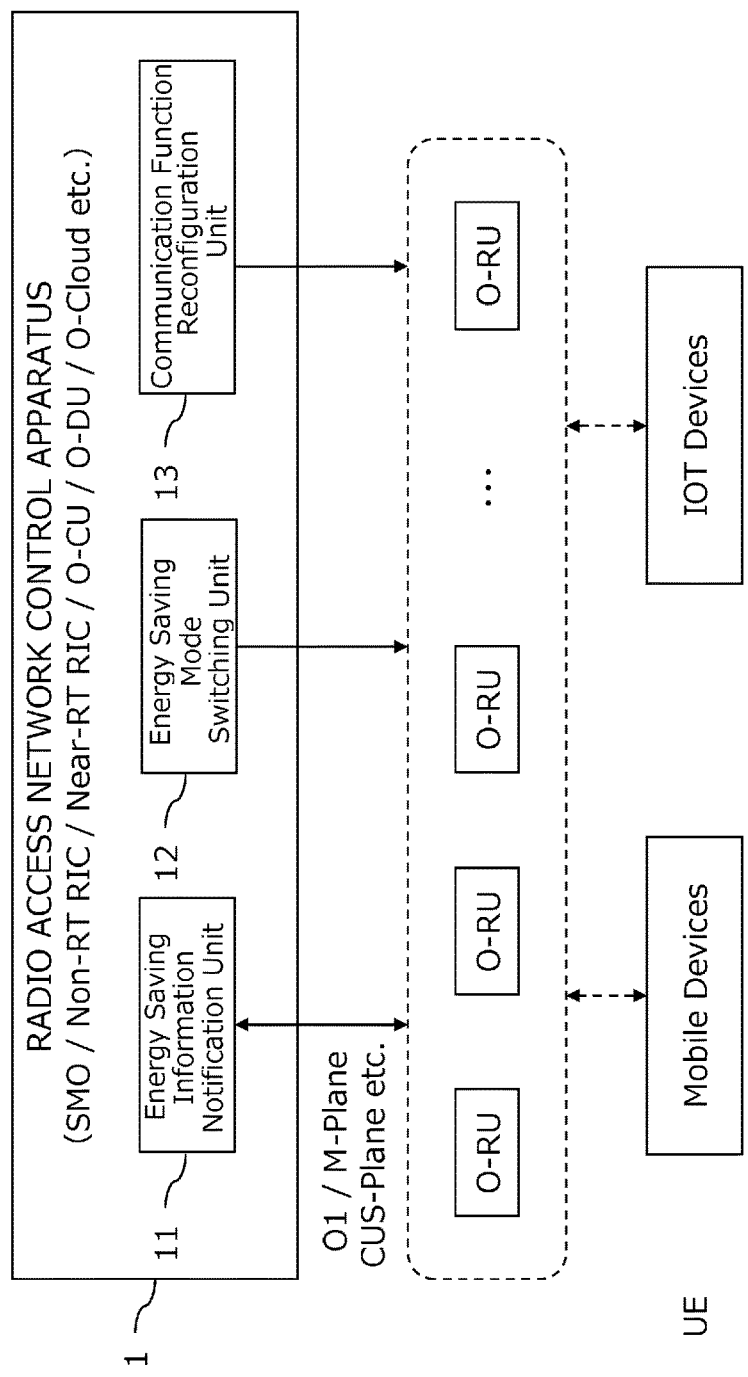
FIG. 4 is a functional block diagram schematically showing a radio access network control apparatus.

FIG. 4 is a functional block diagram schematically showing the radio access network control apparatus 1 according to the present embodiment. The radio access network control apparatus 1 includes an energy saving information notification unit 11, an energy saving mode switching unit 12, and a communication function reconfiguration unit 13. The functional blocks are realized by the cooperation of hardware resources, such as the central processing unit, memory, input devices, output devices, and peripheral devices connected to the computer, and software that is executed using them. Regardless of the type of computer or the installation location, each of the above functional blocks may be realized with the hardware resources of a single computer, or by combining hardware resources distributed across plurality of computers. Especially in the present embodiment, some or all of the functional blocks of the radio access network control apparatus 1 may be realized in a distributed or centralized manner by computer or processor provided in any portions of the O-RAN such as the SMO, the Non-RT RIC, the Near-RT RIC, the RAN node composed by the O-CU and/or the O-DU, the O-Cloud, or may be realized in a distributed or centralized manner by computer or processor provided outside the O-RAN that can communicate with the O-RAN. Although the radio access network control apparatus 1 and the O-RUs are shown separately in FIG. 4 for convenience, some or all of the functional blocks of the radio access network control apparatus 1 may be realized in a distributed or centralized manner by computer or processor provided in the O-RU.

The energy saving information notification unit 11 causes the O-RU to notify energy saving information concerning one or more energy saving modes that the O-RU can support. Specifically, the energy saving information notification unit 11 notifies the energy saving information from the O-RU to at least one of the SMO, the Non-RT RIC, the Near-RT RIC, the O-CU, and the O-DU, through the O1 interface and the Open Fronthaul M-Plane, the Open Fronthaul CUS-Plane and the like. The energy saving information notification unit 11 may be provided in the O-RU and actively notify the energy saving information to the SMO and the like outside the O-RU, or it may be provided outside the O-RU and cause the O-RU to passively the notify energy saving information to SMO and the like outside the O-RU.

FIG. 5 shows a specific example of energy saving modes of O-RU included in the energy saving information notified by the energy saving information notification unit 11. FIG. 5 illustrates five energy saving levels (sleep levels) or energy saving modes (SMs: Sleep Modes) SM1-SM5. The number of energy saving modes is arbitrary, as are the contents and the parameters of each energy saving mode described in detail below. In the example shown in the figure, the energy saving level increases stepwise from the first energy saving mode SM1, which has the lowest energy saving level, to the fifth energy saving mode SM5, which has the highest energy saving level. Each energy saving mode SM1-SM5 includes a first transition time (Deactivation Duration) to the respective energy saving mode, a second transition time (Activation Duration) from the respective energy saving mode, a minimum duration (Minimum Sleep Duration) of the respective energy saving mode, energy saving options (Power Saving Options) or reconfiguration options (Reconfiguration Options) in the respective energy saving mode, and the energy consumption (Power Consumption) of the O-RU in the respective energy saving mode.

The first transition time (Deactivation Duration) is the time required to transition each O-RU from normal mode or other energy saving mode to each energy saving mode. The second transition time (Activation Duration) is the time required to transition each O-RU from each energy saving mode to normal mode or other energy saving mode. minimum duration (Minimum Sleep Duration) is the minimum time during which each O-RU is maintained in each energy saving mode, for example, the minimum duration of the communication function of each O-RU reconfigured by the communication function reconfiguration unit 13 described below in accordance with each energy saving mode. For example, an O-RU switched to the first energy saving mode SM1 by the energy saving mode switching unit 12 transitions from the normal mode and the like to the first energy saving mode SM1 during the first transition time of "35.5 μs". After transitioning to the energy saving mode SM1 and remaining in the first energy saving mode SM1 for the minimum duration of at least "71 μs", the O-RU transitions or returns from the first energy saving mode SM1 to the normal mode and the like during the second transition time of "35.5 μs".

In the second energy saving mode SM2, the first transition time and the second transition time are "0.5 ms" and the minimum duration is "1 ms". In the third energy saving mode SM3, the first transition time and the second transition time are "5 ms" and the minimum duration is "10 ms". In the fourth energy saving mode SM4, the first transition time and the second transition time are "0.5 s" and the minimum duration is "1 s". In the fifth energy saving mode SM5, the first transition time and the second transition time are any time longer than "0.5 s" and the minimum duration is any time longer than "1 s".

As described above, the first transition time and the second transition time in each energy saving mode are preferably equal to each other and the sum of them is preferably equal to the minimum duration. And, the minimum duration in each energy saving mode is preferably an integer multiple of a duration of at least one of the frame, subframe, slot, and symbol that the O-RU can communicate. Especially in the illustrated example, the minimum duration in some energy saving modes is the same as the duration of at least one of the frame, subframe, slot, and symbol. Specifically, the minimum duration of "10 ms" in the third energy saving mode SM3 is the same as the duration of a frame in 5G and the like. Likewise, the minimum duration of "1 ms" in the second energy saving mode SM2 is the same as the duration of a subframe in 5G and the like. Furthermore, the minimum duration of "71 μs" in the first energy saving mode SM1 is the same as the duration of a symbol (where one subframe is composed of one slot including 14 OFDM symbols) in 5G and the like.

It should be noted that, in 5G, depending on the subcarrier spacing set in the network, there are 1 slot (where the subcarrier spacing is 15 kHz), 2 slots (where the subcarrier spacing is 30 kHz), 4 slots (where the subcarrier spacing is 60 kHz), 8 slots (where the subcarrier spacing is 120 kHz), and 16 slots (where the subcarrier spacing is 240 kHz) included in one subframe. Therefore, depending on the subcarrier spacing, the slot durations would be "1 ms" (15 kHz subcarrier spacing), "0.5 ms" (30 kHz subcarrier spacing), "0.25 ms" (60 kHz subcarrier spacing), "0.125 ms" (120 kHz subcarrier spacing), and "0.0625 ms" (240 kHz subcarrier spacing). The slot durations or their integer multiples may be set as the minimum durations in the energy saving modes.

Besides, each slot includes 14 OFDM symbols, regardless of the subcarrier spacing. Therefore, depending on the subcarrier spacing, the symbol durations would be "71 μs" (15 kHz subcarrier spacing), "36 μs" (30 kHz subcarrier spacing), "18 μs" (60 kHz subcarrier spacing), "9 μs" (120 kHz subcarrier spacing), and "4 μs" (240 kHz subcarrier spacing). The symbol durations or their integer multiples may be set as the minimum durations in the energy saving modes.

Energy saving options (Power Saving Options) or reconfiguration options (Reconfiguration Options) are options of energy saving or reconfiguration of each O-RU in each energy saving mode. In the example shown in the figure, for the first energy saving mode SM1, four options are exemplarily shown: "Entirely off", "Partly off", "Hardware reconfiguration" (HW reconfiguration), and "Software reconfiguration" (SW reconfiguration). Although not shown in the figure, similar options can be set for other energy saving modes SM2-SM5.

The energy saving option of "Entirely off" reduces the energy consumption of the O-RU by cutting off power to all components and/or all communication functions of the O-RU for energy saving. The energy saving option of "Partly off" reduces the energy consumption of the O-RU by cutting off power to a portion of components and/or a portion of communication functions of the O-RU for energy saving. Thus, the presence or absence of the "Entirely off" and "Partly off" energy saving options indicates whether or not the communication functions of the O-RU can be deactivated during the energy saving mode.

Here, all or some of the components whose power is cut off or reduced during the "Entirely off" mode or the "Partly off" mode, may contribute to energy saving in the O-RU when switched to the off state. Examples of such components include, but are not limited to, hardware components in the O-RU, software components in the O-RU, specific frequency band and/or specific carrier (carrier wave) available for the O-RU.

If specific frequency band and/or specific carrier are switched to the off state by the Non-RT RIC and the like, the use of such "off frequency band" and/or "off carrier" by the O-RU is prohibited or restricted (or induced to be used as little as possible). In this case, the hardware components and/or the software components in the O-RU are basically kept on (in other words, the M-Plane, the S-Plane, and the C/U-Plane described below are all kept active), in order to continue communication processing related to "on-frequency band" and/or "on-carrier" other than "off-frequency band" and/or "off-carrier". However, as the frequency band and/or carrier for communication processing are reduced, the communication amount or the communication speed decreases (or hardware components and/or software components dedicated to "off-frequency band" and/or "off-carrier" are switched to the off state), thereby energy consumption of the O-RU will be reduced.

On the other hand, if hardware components and/or software components in the O-RU are switched to the off state by the Non-RT RIC and/or the O-DU and the like, during the "Entirely off" mode or "Partly off" mode, the power supply to such components is substantially cut off. However, even in such a case, it is preferable to provide a minimum amount of power to keep the management plane (M-Plane) function of such components in the on state (active state). By keeping the M-Plane active, when a component in the off state is switched back on, the management information maintained by the M-Plane allows the synchronization plane (S-Plane) function and control/user plane (C/U-Plane) function to be quickly reactivated and such component can be quickly returned to a communication-ready state.

It should be noted that, if hardware components and/or software components in the O-RU are switched to the off state, the S-Plane function may be maintained in the active state in addition to the M-Plane function of such components. By keeping the S-Plane active, synchronization information concerning clock and the like between O-RUs and/or between O-RU and O-DU is maintained, thus eliminating the need for synchronization establishment processing after such components are switched back to the on state. As such, although additional power is required to additionally maintain the S-Plane in the active state, components that are switched from the off state to the on state again can be restored to a communication-ready state even more quickly.

As described above, switching hardware components and/or software components to the off state can significantly reduce the energy consumption of the O-RU. On the other hand, additional processing or time are required to switch such components back to the on state again. In contrast, the option of switching specific frequency band and/or specific carrier to the off state keeps hardware components and/or software components in the on state, which reduces the amount of power saved of the O-RU but allows the O-RU to seamlessly remain in the communication-ready state. In light of such trade-off, for example, when transitioning from normal mode to energy saving mode (for the first time), the option to switch specific frequency band and/or specific carrier to the off state may be taken to maintain the O-RU in the communication-ready state. Then, if further energy saving is required or if there is little problem to remove the O-RU from the communication-ready state once, the option to switch hardware components and/or software components to the off state may be taken to maximize the amount of energy saving of the O-RU. By adopting such step-by-step approach, the energy saving modes can be implemented in an appropriate manner depending on the situation.

The energy saving option of "Hardware reconfiguration" (HW reconfiguration) reduces the energy consumption of the O-RU by reconfiguring the hardware of the O-RU for energy saving. For example, if an O-RU is equipped with an integrated circuit that includes reconfigurable hardware such as a field-programmable gate array (FPGA) or a reconfigurable processor, it can be switched to a hardware configuration with lower processing performance, but less energy consumption than the normal mode and the like, in order to reduce energy consumption of the O-RU. The energy saving option of "Software reconfiguration" (SW reconfiguration) reduces the energy consumption of the O-RU by reconfiguring the software executed by the O-RU for energy saving. For example, the energy consumption of the O-RU can be reduced by rewriting the software to one that can execute the similar processes as in the normal mode and the like, but with less energy consumption while reducing the processing speed and the like.

As described above, if multiple energy saving options are included in one energy saving mode, the aforementioned first transition time, second transition time, minimum duration time, and energy consumption described below may be set for each energy saving option. Alternatively, an energy saving mode may be provided for each energy saving option.

Energy consumption (Power consumption) is the amount of energy consumed by the O-RU during each energy saving mode. In the example shown in the figure, for the first energy saving mode SM1, "Energy consumption of the entire O-RU" (Total: XXX Watts), "Energy consumption of Component A" (Component A: xxx Watts), "Energy consumption of Component B" (Component B: yyy Watts), and "Energy consumption of Component C" (Component C: zzz Watts) are exemplarily shown. The "Energy consumption of the entire O-RU" is equal to the sum of the "Energy consumption of Component A", "Energy consumption of Component B", and "Energy consumption of Component C". Although not shown in the figure, similar energy consumptions are input for other energy saving modes SM2-SM5.

The energy consumptions of the entire O-RU for energy saving or each component and/or each communication function of the O-RU are, for example, statistical data based on simulations or past measurements during actual operations. It should be noted that, in addition to or instead of the energy consumption of the O-RU during the energy saving mode as in this example, the statistical data of the energy consumption during the transition of the O-RU from another mode to such energy saving mode (the first transition time) and/or during the transition of the O-RU from such energy saving mode to another mode (the second transition time: strictly speaking, during the period between when the O-RU receives a restart command from the O-DU and the like and when it establishes a communication-ready carrier) may be included in the energy saving information notified by the energy saving information notification unit 11. Besides, the energy consumption of the O-RU in normal mode, which is not an energy saving mode, may be included in the energy saving information notified by the energy saving information notification unit 11 for comparison with the energy consumption of the O-RU in the energy saving mode.

It should be noted that, as described below, if an O-RU is switched to a certain energy saving mode by the energy saving mode switching unit 12 and/or the communication function reconfiguration unit 13, the energy consumptions of the entire O-RU, each component, and each communication function, may be measured in real-time by the O-RU or the radio access network control apparatus 1. The real-time measurement data of energy consumption are shared with the radio access network control apparatus 1 via the energy saving information notification unit 11 and the like, and are compared with the statistical data of energy consumption during the corresponding energy saving mode in FIG. 5. If there is a significant discrepancy between the real-time measurement data and the statistical data, the energy saving mode switching unit 12 and/or the communication function reconfiguration unit 13 may cancel the energy saving mode, since the statistical data may not be reliable that was considered when selecting the energy saving mode.

The various O-RU energy saving information as described above is typically notified to the radio access network control apparatus 1 such as the SMO through the O1 interface, the Open Fronthaul M-Plane, the Open Fronthaul CUS-Plane and the like as described above. However, the energy saving information of the O-RU may be notified to the radio access network control apparatus 1 through other interfaces. For example, the RAN node (O-CU/O-DU) controlling the O-RU may function as the energy saving information notification unit 11 and notify the SMO of the energy saving information of the O-RU to be controlled through the O1 interface, or notify the Near-RT RIC through the E2 interface. Furthermore, the Near-RT RIC may function as the energy saving information notification unit 11 and notify the SMO through the O1 interface of the energy saving information of the O-RU received through the E2 interface, or notify the Non-RT RIC through the A1 interface. Besides, the O-Cloud, which virtually manages RAN node (O-CU/O-DU), may function as the energy saving information notification unit 11 and notify the SMO through the O2 interface of the energy saving information of the O-RU acquired by the RAN node to be controlled.

If the O-Cloud functions as the energy saving information notification unit 11, it is preferable to notify the SMO of the energy saving information of the O-RU through the O2dms interface in FIG. 2. In the case, the SMO (NFO) may acquire the energy saving information of the O-RU from the DMS by various O2dms queries (Query O2dms) to the DMS of the O-Cloud through the O2dms interface, which are specifically exemplified below.

According to the first O2dms query "Query O2dms_Deployment Inventory related Services", information concerning various NF Deployment inventory details, which may include O-RU energy saving information, may be acquired by the NFO of the SMO from the DMS of the O-Cloud through the O2 interface (O2dms).

According to the second O2dms query "Query O2dms_Deployment Monitoring related Services", information concerning telemetry report of each NF Deployment, which may include O-RU energy saving information, may be acquired by the NFO of the SMO from the DMS of the O-Cloud through the O2 interface (O2dms).

According to the third O2dms query "Query O2dms_InfrastructureLifecycleManagement Services", information concerning procedural support for automation of NF Deployment lifecycle events, which may include O-RU energy saving information, may be acquired by the NFO of the SMO from the DMS of the O-Cloud through the O2 interface (O2dms).

The energy saving mode switching unit 12 switches the O-RU to, an energy saving mode that the O-RU can support, that was notified by the energy saving information notification unit 11, and/or, an energy saving mode that the O-RU can support, that the SMO, the Non-RT RIC, the Near-RT RIC, the O-CU, the O-DU, the O-Cloud and the like where the energy saving mode switching unit 12 may be provided, are aware of in advance.

The communication function reconfiguration unit 13 provided in the SMO, the Non-RT RIC, the Near-RT RIC, the O-CU, the O-DU, the O-Cloud and the like reconfigures the communication function of the O-RU. As described above with respect to FIG. 5, examples of options for reconfiguration of the communication function of the O-RU include "Entirely off", "Partly off", "Hardware reconfiguration", and "Software reconfiguration". By selecting the "Entirely off" or "Partly off" reconfiguration option, the communication function reconfiguration unit 13 can deactivate all or some of communication functions of at least one of the plurality of the O-RUs. Conversely, by not selecting the "Entirely off" or "Partly off" reconfiguration option, the communication function reconfiguration unit 13 can activate all or some of communication functions of at least one of the plurality of the O-RUs. It should be noted that the communication function reconfiguration unit 13 may reconfigure the communication function of the O-RU following the reconfiguration option or the energy saving option (FIG. 5) in accordance with the energy saving mode switched by the energy saving mode switching unit 12, or it may reconfigure the communication function of the O-RU independently of such energy saving mode switching.

The energy saving mode switching unit 12 and/or the communication function reconfiguration unit 13 may perform the switching of the energy saving mode of the O-RU and/or the reconfiguration of the communication function of the O-RU in accordance with various criteria for optimizing the O-RU operation or policies based on artificial intelligence and/or machine learning. In particular, to optimize or minimize energy consumption in the O-RU, the energy saving mode switching unit 12 selects one energy saving mode with the lowest energy consumption ("Power Consumption" in FIG. 5) among the (multiple) energy saving modes that can meet the communication demand in the O-RU, and the communication function reconfiguration unit 13 selects the reconfiguration option ("Reconfiguration Options" in FIG. 5) in accordance with the selected energy saving mode.

Such policies and/or necessary information for reconfiguration generated based on artificial intelligence and/or machine learning may be reflected or provided, by the host in the Non-RT RIC (for example, the artificial intelligence/machine learning workflow function described above), directly through the Open Fronthaul or the O1 interface to the O-RU, or indirectly via the A1 interface, the Near-RT RIC, or the RAN node to the O-RU. Below, the first example for the former case and the second example for the latter case will be described respectively.

In the first example, the Non-RT RIC functions as follows.
Collect configuration, performance indicator, measurement report (for example, information concerning cell load, traffic information, EE/EC (Energy Efficiency/Energy Consumption) measurement report, geolocation information) from the SMO, the RAN node, and the O-RU, for training or learning of artificial intelligence/machine learning model that supports EE (Energy Efficiency)/ES (Energy Saving) function.
Perform training of artificial intelligence/machine learning model for EE/ES.
Analyze data received from the SMO or the E2 node to determine whether the transmitter array (transmitter circuit) and/or the receiver array (receiver circuit) of the O-RU can be reconfigured or deactivated.
Reconfigure the RAN node through the O1 interface and reconfigure the O-RU through the Open Fronthaul or the O1 interface. The reconfigurations include deactivating all or some of the transmitter array and/or the receiver array of the O-RU.

In the first example, the RAN node functions as follows.
Report information concerning cell load or traffic per cell and/or carrier through the O1 interface. Report EE/EC measurement report for the RAN node through the O1 interface.
Support actions required to perform reconfiguration (including on-off control) of the transmitter array and/or the receiver array of the O-RU.
Support actions required by changes in antenna configuration (for example, relationship among number of synchronization signal blocks (SSBs), endpoint addressing, power per antenna, number of MIMO data layers, number of spatial streams, and maximum number of MU-MIMO layers).

In the first example, the O-RU functions as follows.
Report information concerning EC and/or EE through the Open Fronthaul M-Plane or the O1 interface.
Support actions required to perform reconfiguration (including on-off control) of the transmitter array and/or the receiver array of the O-RU.
Support actions required by changes in antenna configuration (for example, relationship among number of SSBs, endpoint addressing, power per antenna, number of MIMO data layers, number of spatial streams, and maximum number of MU-MIMO layers).

In the second example, the Non-RT RIC functions as follows.
Collect configuration, performance indicator, measurement report (for example, information concerning cell load, traffic information, EE/EC measurement report, geolocation information) from the SMO, the RAN node, and the O-RU, for training or learning of artificial intelligence/machine learning model that supports EE/ES function.
Perform training of artificial intelligence/machine learning model for EE/ES.
Analyze data received from the SMO or the E2 node to determine whether the transmitter array and/or the receiver array of the O-RU can be reconfigured or on-off switched.
Provide policy or necessary information for reconfiguration (including on-off control) of the transmitter array and/or the receiver array of the O-RU through the A1 interface.
Provide policy or necessary information for actions such as transferring a communication device on a cell edge to another carrier through the A1 interface.

In the second example, the Near-RT RIC functions as follows.
Provide policy or necessary information for configuring the O-RAN node to reflect the reconfiguration (including on-off control) of the transmitter array and/or the receiver array of the O-RU, based on information received from the A1 interface, through the E2 interface.

In the second example, the RAN node functions as follows.
  Report information concerning cell load or traffic per cell and/or carrier through the E2 interface. Report EE/EC measurement report through the E2 interface.
  Support actions required to perform reconfiguration (including on-off control) of the transmitter array and/or the receiver array of the O-RU.
  Perform control of reconfiguration of SSB, change of antenna power of the O-RU, transmitter/receiver endpoint mapping, MIMO data layers, spatial streams, and maximum number of MU-MIMO layers.

In the second example, the O-RU functions as follows.
  Report information concerning EC and/or EE through the Open Fronthaul M-Plane.
  Support actions required to perform reconfiguration (including on-off control) of the transmitter array and/or the receiver array of the O-RU.
  Support actions such as renewal of transmitter/receiver endpoint mapping and change of antenna power.

The control of the O-RU by the energy saving mode switching unit 12 and/or the communication function reconfiguration unit 13 as described above is typically performed by the Non-RT RIC, the Near-RT RIC, the RAN node (O-CU/O-DU) and the like connected by the A1 interface and the E2 interface. However, the control of the O-RU by the energy saving mode switching unit 12 and/or the communication function reconfiguration unit 13 may be performed by other components of the O-RAN through other interfaces. For example, the SMO, the Non-RT RIC, the Near-RT RIC, the RAN node (O-CU/O-DU) and the like, where the energy saving mode switching unit 12 and/or the communication function reconfiguration unit 13 are provided, may directly control the O-RU through the O1 interface, the Open Fronthaul M-Plane, the Open Fronthaul CUS-Plane and the like. Furthermore, the O-Cloud, which virtually manages the RAN node (O-CU/O-DU), may function as the energy saving mode switching unit 12 and/or communication function reconfiguration unit 13 to cause the RAN node to indirectly control the O-RU.

If the O-Cloud functions as the energy saving mode switching unit 12 and/or the communication function reconfiguration unit 13, it is preferable that the NFO of the SMO provides the DMS of the O-Cloud with control information for switching the energy saving mode of the O-RU and/or reconfiguring the communication function of the O-RU, through the O2dms interface in FIG. 2.

According to the embodiment described above, energy consumption in the O-RU can be effectively managed based on the energy saving information concerning the energy saving mode that the O-RU can support, notified from the O-RU by the energy saving information notification unit 11. Also, according to the embodiment, the communication function of the O-RU can be flexibly reconfigured by the communication function reconfiguration unit 13.

FIG. 6 shows other specific example of multiple energy saving modes that can be supported by O-RU. Some or all of the contents described with respect to the present figure may be applied to the energy saving modes described with respect to FIG. 5, and some or all of the contents described with respect to FIG. 5 may be applied to the energy saving modes described with respect to the present figure.

FIG. 6 illustrates four energy saving levels (Sleep Levels) or energy saving modes (SM: Sleep Modes) SM1-SM4. The number of energy saving modes is arbitrary, and the contents and parameters of each energy saving mode, which are described in detail below, are also arbitrary. In the example shown in the figure, the energy saving level increases stepwise, from the first energy saving mode SM1 with the lowest energy saving level, to the fourth energy saving mode SM4 with the highest energy saving level. For convenience, the first energy saving mode SM1 is named "Micro Sleep", the second energy saving mode SM2 is named "Light Sleep", the third energy saving mode SM3 is named "Deep Sleep", and the fourth energy saving mode SM4 is named "Hibernate Sleep".

Each energy saving mode SM1-SM4 includes duration (Sleep Duration), hardware component of the O-RU to be switched to the off state (HW component to be turned off), MIMO setting, clock on/off (Clock), and active planes (Active planes). The information constitutes the energy saving information as in FIG. 5 and are notified by the energy saving information notification unit 11.

The duration (Sleep Duration) is the duration of each energy saving mode SM1-SM4. The minimum value of the duration corresponds to the minimum duration (Minimum Sleep Duration) in FIG. 5. The duration in at least one of the multiple energy saving modes SM1-SM4 is an integer multiple of the duration of at least one of the frame ("10 ms" in 5G), the subframe ("1 ms" in 5G), the slot ("0.0625 ms" to "1 ms" in 5G), and the symbol ("4 μs" to "71 μs" in 5G) that the O-RU can communicate. Specifically, the duration of the first energy saving mode SM1 is an integer multiple of the duration of the symbol, and shorter than the duration of the slot. That is, in 5G where a slot includes 14 OFDM symbols, the duration of the first energy saving mode SM1 is N times the symbol duration, with N as any integer between 1-13. In particular, for the shortest case N=1, the duration of one symbol (in 5G, the shortest is "4 μs") is the duration of the first energy saving mode SM1. As such, by utilizing the extremely short symbol length as a unit, "Micro Sleep" can be efficiently introduced in gap times when an O-RU does not communicate, thereby enabling effective energy saving of the O-RU.

The duration of the second energy saving mode SM2 is longer than the duration of the first energy saving mode SM1, and is, for example, 5-10 ms at the maximum. The duration of the third energy saving mode SM3 is longer than the duration of the second energy saving mode SM2, and is, for example, 50-100 ms at the maximum. The duration of the fourth energy saving mode SM4 is longer than the duration of the third energy saving mode SM3, and is, for example, 1000 ms at the maximum. It should be noted that, in the third energy saving mode SM3 and the fourth energy saving mode SM4, where the duration can exceed 50 ms, it is preferable that information sharing or cooperative operation with neighboring cells is performed so that the user experience is not adversely affected. Although the turning-off of a component such as hardware or switching of MIMO setting and the like in each energy saving mode SM1-SM4 can be performed by existing technologies such as 5G and O-RAN, especially in the energy saving modes SM2-SM4 whose durations are longer than the slot length (strictly speaking, an integer multiple of the duration of at least one of the slot, the subframe, and the frame), a component of the O-RU can be switched to the off state by the transmission blanking process during such duration by the energy saving mode switching unit 12.

The transmission blanking is a technology available for "Section Type 0" in O-RAN, where an O-DU notifies an O-RU that a specific PRB (Physical Resource Block) or a specific symbol in the downlink or the uplink is not used during an idle period or a guard period. The O-RU that has recognized that the communication will be stopped during the idle period or the guard period notified by the O-DU, can reduce its energy consumption by transitioning to either of the energy saving modes SM2-SM4 with a duration matching such idle period or such guard period. It should be noted that, if the transmission blanking is extended by utilizing "Section Extension 7" in O-RAN, the energy saving mode can be efficiently applied to multiple "eAxC IDs" in the case of multi-component carriers or array carriers.

To allow each O-RU to transition to an energy saving mode with the longest possible duration, it is preferable to utilize traffic shaping of a group of communication devices (UEs) or frequency control such as carrier aggregation together under the control of the Non-RT RIC or the Near-RT RIC. For example, traffic of a group of communication devices may be directed or concentrated to other O-RUs or other time slots in order to transition an O-RU to an energy saving mode with a higher energy saving level such as "Deep Sleep" or "Hibernate Sleep". Besides, when transitioning certain carriers of an O-RU to the off state, carrier aggregation with other O-RUs can be performed for the carriers that are maintained in the on state to ensure the necessary frequency capacity.

The hardware component of the O-RU that is switched to the off state (HW component to be turned off) corresponds to the hardware component of the O-RU that is switched to the off state by the "Entirely off" or the "Partly off" in the energy saving options in FIG. 5, or the hardware component of the O-RU that is no longer in use as a result of the hardware reconfiguration (HW reconfiguration). It should be noted that, although only hardware component is illustrated in FIG. 6 as component to be switched to the off state, other components as described above with respect to FIG. 5, such as software components and frequency components such as frequency bands/carriers, may be specified as the off-targets in each energy saving mode SM1-SM4.

In the first energy saving mode SM1 in FIG. 6, most of the amplifier circuit, such as power amplifier and low-noise amplifier, are switched to the off state with the power supply cut off. Since, for the first energy saving mode SM1 with the shortest duration, quick and frequent switching between the on state (the normal mode) and the off state (the first energy saving mode SM1) is required, it is preferable that analog circuits such as amplifier circuits that can quickly return to the operating state (the normal mode) by restoring power even from the power-off state (the first energy saving mode SM1) are specified as the off-targets.

In the second energy saving mode SM2 in FIG. 6, in addition to the amplifier circuit and the like switched to the off state in the first energy saving mode SM1, most of the transmitter circuit and/or the receiver circuit such as the transceiver circuit are switched to the off state with the power supply cut off. As such, the number of the O-RU components that are switched to the off state in the second energy saving mode SM2 is larger than the number of the O-RU components that are switched to the off state in the first energy saving mode SM1. In the second energy saving mode SM2, the time required to return to the normal mode (corresponding to the second transition time (Activation Duration) in FIG. 5) is longer than in the first energy saving mode SM1. However, in the second energy saving mode SM2, more components are switched to the off state for a longer duration than in the first energy saving mode SM1, resulting in more reduction of the energy consumption.

In the third energy saving mode SM3 in FIG. 6, almost all hardware components of the O-RU, including the amplifier circuit, the transmitter circuit, the receiver circuit and the like switched to the off state in the second energy saving mode SM2, are switched to the off state with the power supply cut off. As such, the number of the O-RU components that are switched to the off state in the third energy saving mode SM3 is larger than the number of the O-RU components that are switched to the off state in the second energy saving mode SM2. In the third energy saving mode SM3, the time required to return to the normal mode (the second transition time) is longer than in the second energy saving mode SM2. However, in the third energy saving mode SM3, more components are switched to the off state for a longer duration than in the second energy saving mode SM2, resulting in more reduction of the energy consumption. It should be noted that even in the third energy saving mode SM3, the synchronization circuit that maintains clocks and the like among 0-RUs and/or among O-RU and O-DU is kept in the on state. Therefore, the synchronization establishment process becomes unnecessary when the O-RU returns to the normal mode from the third energy saving mode SM3.

In the fourth energy saving mode SM4 in FIG. 6, all hardware components (and all software components and all frequency components) of the O-RU, also including the synchronization circuit that was not switched to the off state in the third energy saving mode SM3, are switched to the off state with the power supply cut off. Thus, in the fourth energy saving mode SM4, which has the longest duration among the multiple energy saving modes SM1-SM4, all components of the O-RU are switched to the off state by the energy saving mode switching unit 12. Therefore, the number of the O-RU components that are switched to the off state in the fourth energy saving mode SM4 is larger than the number of the O-RU components that are switched to the off state in the third energy saving mode SM3. In the fourth energy saving mode SM4, the time required to return to the normal mode (the second transition time) is longer than in the third energy saving mode SM3. However, in the fourth energy saving mode SM4, more components are switched to the off state for a longer duration than in the third energy saving mode SM3, resulting in more reduction of the energy consumption.

The MIMO setting corresponds to the antenna reconfiguration included in the hardware reconfiguration (HW reconfiguration) in the energy saving option in FIG. 5. Specifically, for example, the number of antennas to be kept in the active state (the on state) out of a large number (for example, 128) of antennas for MIMO is specified as the energy saving information of each energy saving mode SM1-SM4.

In the example in FIG. 6, 64 antennas are kept active in the first energy saving mode SM1, 16 antennas are kept active in the second energy saving mode SM2, 4 antennas are kept active in the third energy saving mode SM3, and 0 antennas are kept active (all antennas are switched to the inactive state (the off state)) in the fourth energy saving mode SM4. As described below, in each energy saving mode SM1-SM4, the user plane (U-Plane) function is temporarily deactivated, but some or all of the other planes such as the control plane (C-Plane), the synchronization plane (S-Plane), and the management plane (M-Plane) may be maintained in the active state. The antennas maintained in the active state may be utilized to meet the communication demands of such active planes. Besides, even if the antennas maintained in the active state in each energy saving mode SM1-SM4 are not used for actual communication, there is an advantage that the antennas in the active state do not need to be reactivated when returning to the normal mode.

The clock on/off (Clock) corresponds to the state of the synchronization circuit in the "hardware component of the O-RU to be switched to the off state (HW component to be turned off)" and the state of the synchronization plane in the "Active planes" described below. Specifically, in the energy saving modes SM1-SM3, the clock is maintained in the on state (On) by the "on" synchronization circuit and the "on" synchronization plane. In the energy saving mode SM4, the clock is not maintained in the on state (Off) by the "off" synchronization circuit and the "off" synchronization plane. As mentioned above, the synchronization establishment process becomes unnecessary when the O-RU returns to the normal mode from the energy saving modes SM1-SM3 where the clock is in the on state. On the other hand, the synchronization establishment process is necessary when the O-RU returns to the normal mode from the energy saving mode SM4 where the clock is in the off state. However, in the fourth energy saving mode SM4, all components are switched to the off state for a longer duration than in the other energy saving modes SM1-SM3, resulting in more reduction of the energy consumption.

The active planes are planes that are maintained in the on state without being switched to the off state in each energy saving mode SM1-SM4. For example, among the user plane (U-Plane), the control plane (C-Plane), the synchronization plane (S-Plane), and the management plane (M-Plane), all or some of the user plane function involved in transmitting and receiving user data are switched to the off state in all energy saving modes SM1-SM4.

In the first energy saving mode SM1 and the second energy saving mode SM2 in FIG. 6, at least portion of the respective functions of the control plane, the synchronization plane, and the management plane except for the user plane are maintained in the on state. However, in the second energy saving mode SM2, the percentage of the functions of each plane that are maintained in the on state is preferably lower than in the first energy saving mode SM1. In the third energy saving mode SM3 in FIG. 6, at least portion of the synchronization plane function and the management plane functions are maintained in the on state. In the fourth energy saving mode SM4 in FIG. 6, at least portion of the management plane function (only) is maintained in the on state. In the example in FIG. 6, since at least portion of the management plane function is maintained in the on state in all energy saving modes SM1-SM4, the management information maintained by the management plane allows the other plane functions in the off state to be quickly reactivated and the O-RU can be quickly returned to the normal mode. The mapping of the energy saving modes SM1-SM4 and active plane functions in FIG. 6 is just an example, and the present disclosure is not limited to this. However, it is preferable to follow the principle that as the energy saving level increases (from SM1 to SM4), the active plane functions decrease.

Figure 7:
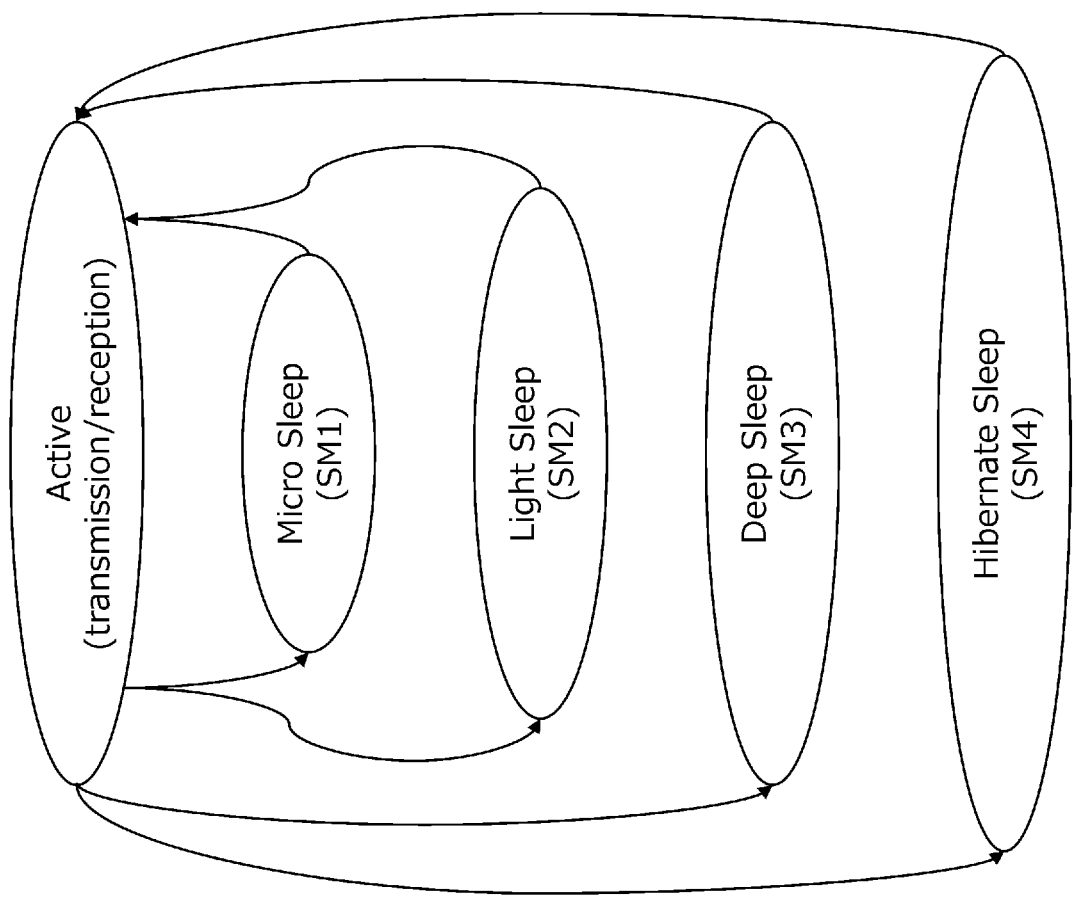
FIG. 7 schematically shows a first example of a transition scheme among a normal mode and four energy saving modes of O-RU.

FIG. 7 schematically shows a first example of a transition scheme among the normal mode of the O-RU, represented as "Active", and the four energy saving modes SM1-SM4 as shown in FIG. 6. In the example, the O-RU in the normal mode is directly transitioned by the energy saving mode switching unit 12 to an appropriate energy saving mode in accordance with the energy saving level required by the O-DU and the like. Besides, the O-RU in each energy saving mode is directly transitioned by the energy saving mode switching unit 12 from each energy saving mode to the normal mode, when its duration (for example, "Sleep Duration" in FIG. 6) has passed or new traffic arises to be processed by the O-RU.

Figure 8:
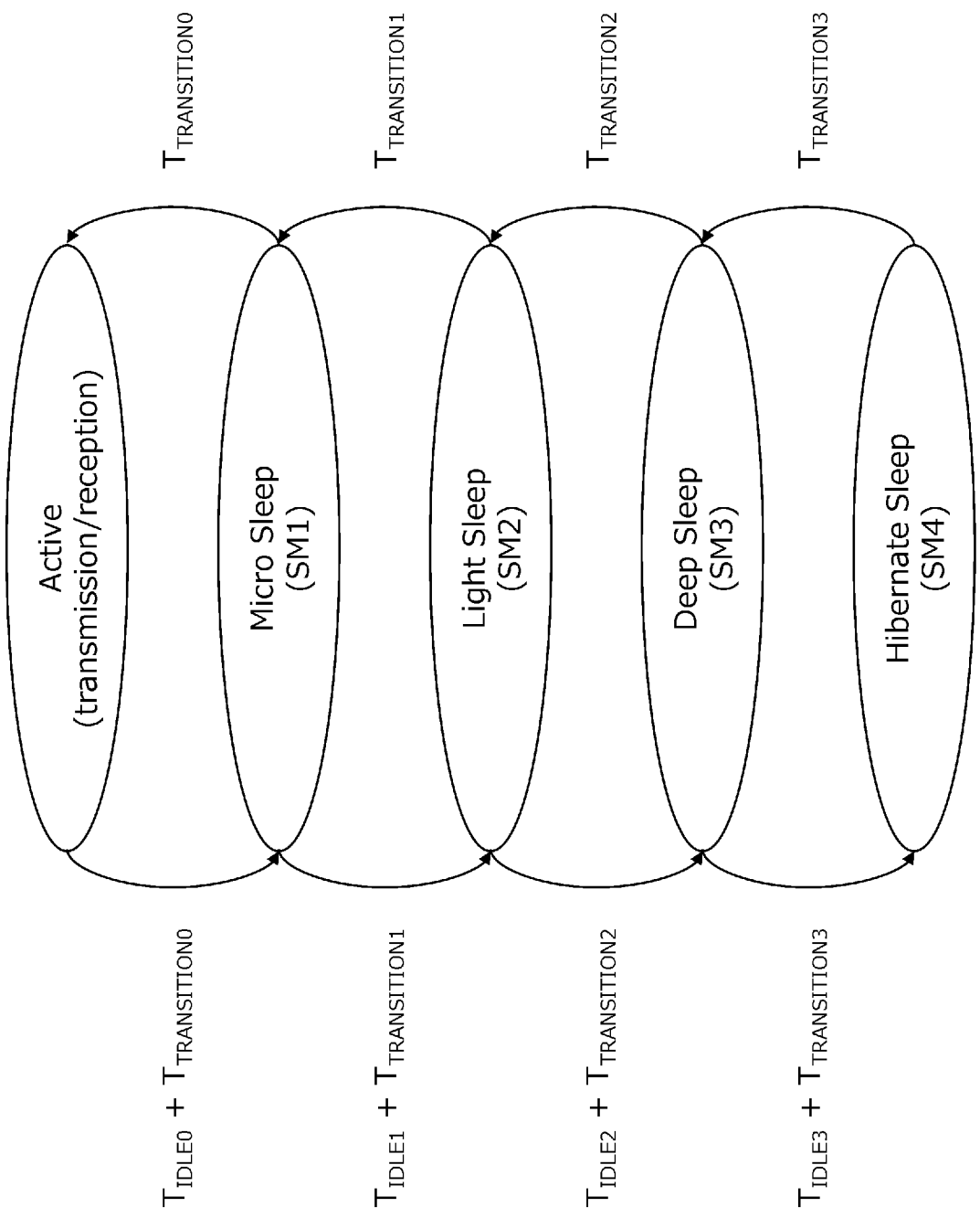
FIG. 8 schematically shows a second example of a transition scheme among a normal mode and four energy saving modes of O-RU.

FIG. 8 schematically shows a second example of a transition scheme among the normal mode of the O-RU, represented as "Active", and the four energy saving modes SM1-SM4 as shown in FIG. 6. In the example, if the O-RU in the normal mode is in the idle state for a predetermined $0^{th}$ idle time $T_{IDLE0}$, it transitions to the first energy saving mode SM1 (Micro Sleep) over the $0^{th}$ transition time $T_{TRANSITION0}$ (corresponding to "Deactivation Duration" in FIG. 5). Then, if the O-RU in the first energy saving mode SM1 is in the idle state for a predetermined first idle time $T_{IDLE1}$, it transitions to the second energy saving mode SM2 (Light Sleep) over the first transition time $T_{TRANSITION1}$. Then, if the O-RU in the second energy saving mode SM2 is in the idle state for a predetermined second idle time $T_{IDLE2}$, it transitions to the third energy saving mode SM3 (Deep Sleep) over the second transition time $T_{TRANSITION2}$. Then, if the O-RU in the third energy saving mode SM3 is in the idle state for a predetermined third idle time $T_{IDLE3}$, it transitions to the fourth energy saving mode SM4 (Hibernate Sleep) over the third transition time $T_{TRANSITION3}$.

As described above, in the example, when the energy saving mode switching unit 12 transitions the O-RU from the normal mode (Active), in which all components of the O-RU are in the on state, to the energy saving modes SM2-SM4 at higher energy saving level, the energy saving mode switching unit 12 causes the O-RU to undergo the energy saving modes SM1-SM3 at lower energy saving level. The longer the O-RU remains idle, the higher energy saving level of energy saving mode will be automatically or adaptively reached, thereby optimizing the energy saving in the O-RU.

The O-RU in each energy saving mode is transitioned by the energy saving mode switching unit 12 from each energy saving mode to the normal mode, when an event occurs that requires the O-RU to be released from the idle state, such as when new traffic arises to be processed by the O-RU. In such a case, as shown in the figure, the O-RU may return to the normal mode from an energy saving mode with a higher energy saving level via an energy saving mode with a lower energy saving level. The transition time between each mode (corresponding to the "Activation Duration" in FIG. 5) is preferably equal to the aforementioned $0^{th}$ transition time $T_{Transition0}$, the first transition time $T_{TRANSITION1}$, the second transition time $T_{TRANSITION2}$, and the third transition time $T_{TRANSITION3}$ respectively, but may be different from them. Besides, when the O-RU in each energy saving mode returns to the normal mode, it may directly transition from the respective energy saving mode to the normal mode as in FIG. 7.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.
1. A radio access network control apparatus that controls O-RAN including O-RU as radio unit, comprising at least one processor that performs:
by an energy saving mode switching unit, switching the O-RU to one of a plurality of energy saving modes among which at least one of a component of the O-RU to be switched to an off state and a duration differs.
2. The radio access network control apparatus according to item 1, wherein the duration in at least one of the plurality of energy saving modes is an integer multiple of a duration of at least one of frame, subframe, slot, and symbol that the O-RU can communicate.
3. The radio access network control apparatus according to item 2, wherein the duration in at least one of the plurality of energy saving modes is an integer multiple of the duration of the symbol and shorter than the duration of the slot.
4. The radio access network control apparatus according to item 2 or 3, wherein the duration in at least one of the plurality of energy saving modes is equal to the duration of the symbol.
5. The radio access network control apparatus according to any of items 2 to 4, wherein
the duration in at least one of the plurality of energy saving modes is an integer multiple of the duration of at least one of the frame, the subframe, and the slot, and the energy saving mode switching unit switches a component of the O-RU to the off state by a transmission blanking process during the duration.
6. The radio access network control apparatus according to any of items 1 to 5, wherein the component switched to the off state in the O-RU switched to one of the energy saving modes by the energy saving mode switching unit includes at least one of hardware component of the O-RU, software component of the O-RU, and frequency available for the O-RU.
7. The radio access network control apparatus according to item 6, wherein the hardware component of the O-RU includes at least one of an antenna, an amplifier circuit, a transmitter circuit, a receiver circuit, and a synchronization circuit.
8. The radio access network control apparatus according to any of items 1 to 7, wherein in the energy saving mode with the longest duration among the plurality of energy saving modes, all components of the O-RU are switched to the off state by the energy saving mode switching unit.
9. The radio access network control apparatus according to any of items 1 to 8, wherein the plurality of energy saving modes includes a first energy saving mode and a second energy saving mode, and
the number of components of the O-RU that are switched to the off state in the first energy saving mode is less than the number of components of the O-RU that are switched to the off state in the second energy saving mode.
10. The radio access network control apparatus according to any of items 1 to 9, wherein
the plurality of energy saving modes includes a first energy saving mode and a second energy saving mode, and
the duration of the first energy saving mode is shorter than the duration of the second energy saving mode.
11. The radio access network control apparatus according to item 9 or 10, wherein the energy saving mode switching unit causes the O-RU to undergo the first energy saving mode, when transitioning the O-RU to the second energy saving mode from a normal mode in which all components of the O-RU are in an on state.
12. The radio access network control apparatus according to any of items 1 to 11, wherein the management plane function of the O-RU is maintained after being switched to one of the energy saving modes by the energy saving mode switching unit.
13. The radio access network control apparatus according to item 12, wherein the synchronization plane function of the O-RU is maintained after being switched to one of the energy saving modes by the energy saving mode switching unit.
14. The radio access network control apparatus according to any of items 1 to 13, wherein
the at least one processor further performs, by an energy saving information notification unit, causing the O-RU to notify energy saving information concerning a component of the O-RU to be switched to the off state and a duration, for each of the plurality of energy saving modes that the O-RU can support, and
the energy saving mode switching unit switches the O-RU to one of the plurality of energy saving modes based on the energy saving information.
15. The radio access network control apparatus according to item 14, wherein the energy saving information includes at least one of a first transition time to each of the energy saving modes and a second transition time from each of the energy saving modes.
16. The radio access network control apparatus according to item 15, wherein the first transition time and the second transition time are equal.
17. The radio access network control apparatus according to any of items 14 to 16, wherein the energy saving information includes the energy consumption of the O-RU in each of the energy saving modes.
18. The radio access network control apparatus according to any of items 1 to 17, wherein the at least one processor further performs, by a communication function reconfiguration unit, reconfiguring the communication function of the O-RU in accordance with the energy saving mode switched by the energy saving mode switching unit.
19. A radio access network control method that controls O-RAN including O-RU as radio unit, comprising:
switching the O-RU to one of a plurality of energy saving modes among which at least one of a component of the O-RU to be switched to an off state and a duration differs.
20. A computer-readable medium storing a radio access network control program that controls O-RAN including O-RU as radio unit, causing a computer to perform:
switching the O-RU to one of a plurality of energy saving modes among which at least one of a component of the O-RU to be switched to an off state and a duration differs.

The application claims priority of Japanese patent application 2022-021185, filed on Feb. 15, 2022, PCT international application PCT/JP2022/028091, filed on Jul. 19, 2022, and Japanese patent application 2022-119061, filed on Jul. 26, 2022, which are hereby incorporated by reference in their entirety.

The present disclosure relates to switching of O-RU to a plurality of power saving modes.

1 radio access network control apparatus, 11 energy saving information notification unit, 12 energy saving mode switching unit, 13 communication function reconfiguration unit.

What is claimed is:

1. A radio access network control apparatus that controls O-RAN including O-RU as radio unit, comprising at least one processor that performs:
   acquiring information concerning communication status of the O-RU;
   determining, based on the acquired information, one or more components of the O-RU to be switched to an off state;
   by an energy saving mode switching unit, switching the O-RU to one of a plurality of energy saving modes among which at least one of a component of the O-RU to be switched to an off state and a duration differs, wherein the switched energy saving mode causes at least one of the determined one or more components to an off state.

2. The radio access network control apparatus according to claim 1, wherein the duration in at least one of the plurality of energy saving modes is an integer multiple of a duration of at least one of frame, subframe, slot, and symbol that the O-RU can communicate.

3. The radio access network control apparatus according to claim 2, wherein the duration in at least one of the plurality of energy saving modes is an integer multiple of the duration of the symbol and shorter than the duration of the slot.

4. The radio access network control apparatus according to claim 3, wherein the duration in at least one of the plurality of energy saving modes is equal to the duration of the symbol.

5. The radio access network control apparatus according to claim 2, wherein the duration in at least one of the plurality of energy saving modes is an integer multiple of the duration of at least one of the frame, the subframe, and the slot, and
   the energy saving mode switching unit switches a component of the O-RU to the off state by a transmission blanking process during the duration.

6. The radio access network control apparatus according to claim 1, wherein the component switched to the off state in the O-RU switched to one of the energy saving modes by the energy saving mode switching unit includes at least one of hardware component of the O-RU, software component of the O-RU, and frequency available for the O-RU.

7. The radio access network control apparatus according to claim 6, wherein the hardware component of the O-RU includes at least one of an antenna, an amplifier circuit, a transmitter circuit, a receiver circuit, and a synchronization circuit.

8. The radio access network control apparatus according to claim 1, wherein in the energy saving mode with the longest duration among the plurality of energy saving modes, all components of the O-RU are switched to the off state by the energy saving mode switching unit.

9. The radio access network control apparatus according to claim 1, wherein the plurality of energy saving modes includes a first energy saving mode and a second energy saving mode, and
   the number of components of the O-RU that are switched to the off state in the first energy saving mode is less than the number of components of the O-RU that are switched to the off state in the second energy saving mode.

10. The radio access network control apparatus according to claim 9, wherein the plurality of energy saving modes includes a first energy saving mode and a second energy saving mode, and
    the duration of the first energy saving mode is shorter than the duration of the second energy saving mode.

11. The radio access network control apparatus according to claim 9, wherein the energy saving mode switching unit causes the O-RU to undergo the first energy saving mode, when transitioning the O-RU to the second energy saving mode from a normal mode in which all components of the O-RU are in an on state.

12. The radio access network control apparatus according to claim 1, wherein the management plane function of the O-RU is maintained after being switched to one of the energy saving modes by the energy saving mode switching unit.

13. The radio access network control apparatus according to claim 12, wherein the synchronization plane function of the O-RU is maintained after being switched to one of the energy saving modes by the energy saving mode switching unit.

14. The radio access network control apparatus according to claim 1, wherein the at least one processor further performs, by an energy saving information notification unit, causing the O-RU to notify energy saving information concerning a component of the O-RU to be switched to the off state and a duration, for each of the plurality of energy saving modes that the O-RU can support, and
    the energy saving mode switching unit switches the O-RU to one of the plurality of energy saving modes based on the energy saving information.

15. The radio access network control apparatus according to claim 14, wherein the energy saving information includes at least one of a first transition time to each of the energy saving modes and a second transition time from each of the energy saving modes.

16. The radio access network control apparatus according to claim 15, wherein the first transition time and the second transition time are equal.

17. The radio access network control apparatus according to claim 14, wherein the energy saving information includes the energy consumption of the O-RU in each of the energy saving modes.

18. The radio access network control apparatus according to claim 1, wherein the at least one processor further performs, by a communication function reconfiguration unit, reconfiguring the communication function of the O-RU in accordance with the energy saving mode switched by the energy saving mode switching unit.

19. A radio access network control method that controls O-RAN including O-RU as radio unit, comprising:
    acquiring information concerning communication status of the O-RU;
    determining, based on the acquired information, one or more components of the O-RU to be switched to an off state;
    switching the O-RU to one of a plurality of energy saving modes among which at least one of a component of the O-RU to be switched to an off state and a duration differs, wherein the switched energy saving mode causes at least one of the determined one or more components to an off state.

20. A non-transitory computer-readable medium storing a radio access network control program that controls O-RAN including O-RU as radio unit, causing a computer to perform:

acquiring information concerning communication status of the O-RU;

determining, based on the acquired information, one or more components of the O-RU to be switched to an off state;

switching the O-RU to one of a plurality of energy saving modes among which at least one of a component of the O-RU to be switched to an off state and a duration differs, wherein the switched energy saving mode causes at least one of the determined one or more components to an off state.

* * * * *